United States Patent Office 3,450,685
Patented June 17, 1969

3,450,685
POLYMERIZATION
William J. Trepka and Richard J. Sonnenfeld, Bartlesville, Okla., assignors to Phillips Petroleum Company, a corporation of Delaware
No Drawing. Filed Apr. 28, 1967, Ser. No. 634,454
Int. Cl. C08d 3/16
U.S. Cl. 260—94.2                                7 Claims

ABSTRACT OF THE DISCLOSURE

Isoprene is polymerized using monobromophenyllithium and 1,3-dibromobenzene.

---

This case relates to new and improved method for polymerizing isoprene.

Heretofore conjugated dienes have been polymerized using organolithium compounds. In some polymerization processes, modifiers have been employed.

It has now been found that isoprene can be polymerized using monobromophenyllithium in the presence of 1,3-dibromobenzene and the surprising result obtained that the inherent viscosity of the resulting polyisoprene is decreased, thereby rendering the polyisoprene more processable, even though at the same time the monomer conversion is increased. It was very unexpected to find that the inherent viscosity of the polyisoprene could be decreased while at the same time increasing the percentage of monomer conversion for the process since it is normally expected by those skilled in the art that increasing conversions yield polymers of increasing viscosity. It should be noted that this discussion is based upon the premise that the initiator level remains the same while both the conversion percentage and the inherent viscosity are varied.

Another surprising result was that the effects obtained by the use of 1,3-dibromobenzene were not obtained with 1,4-dibromobenzene or bromobenzene.

The polyisoprene produced by the method of this invention is useful as a rubber for making pneumatic tires and the like.

Accordingly, it is an object of this invention to provide a new and improved method for producing polyisoprene.

Other aspects, objects, and advantages of this invention will be apparent to those skilled in the art from the description and appended claims.

According to this invention, isoprene is polymerized in a conventional manner using a monobromophenyllithium compound such as 3-, or 4-bromophenyllithium, preferably 3-bromophenyllithium, as the initiator and 1,3-dibromobenzene as a modifier.

The amount of initiator employed can vary widely but will generally be that which is sufficient to effect polymerization of the isoprene and generally will be that amount which will provide from about 0.05 to about 50 milliequivalents of lithium per 100 grams of isoprene to be polymerized. The amount of modifier employed can also vary widely, but will generally be that which is sufficient to, with constant initiator levels, reduce the inherent viscosity of the resulting polyisoprene notwithstanding increasing monomer conversion percentages, and can generally be in the range of from about 0.01 to about 5 mols. of modifier per each mol. of initiator present in the polymerization mixture.

Polymerization processes of this invention can be carried out in any conventional manner known in the art and will generally employ temperatures in the range of from about −100 to about 150° C., and pressures sufficient to maintain the polymerization mixture substantially in the liquid phase. The polymerization can be carried out in the presence or absence of conventional diluents. Suitable diluents include those selected from the group consisting of aromatics, aliphatics, cycloaliphatics, combinations thereof such as alkyl aromatics, and the like, said diluents preferably containing from 4 to 15 carbon atoms per molecule, inclusive. Suitable diluents include benzene, toluene, cyclohexane, methylcyclohexane, xylene, n-butene, n-hexane, n-pentane, isooctane, and the like.

The reactants can be charged to the polymerization reactor in any conventional manner known in the art. The modifier of this invention can be charged to the polymerization reactor concurrently with the initiator, before the initiator is charged, or at any time until the polymerization has gone to 70 percent of normal completion, normal completion being 100 percent polymerization or less than 100 percent polymerization of the monomer. The modifier can be added in increments, charged completely at one time, or added in any other conventional manner.

The polyisoprene produced can be recovered and treated in any conventional manner, and can be compounded with conventional additives such as carbon black, pigments, antioxidants, other stabilizers, and the like.

If desired, polyisoprene can be produced in accordance with this invention with the additional presence, during polymerization, of one of tetraallyltin (TAT) and tetravinyltin (TVT) to improve the processability of the polyisoprene produced. Generally, from about 0.025 to about 1.25 millimoles of the TAT or TVT are employed per 100 grams of isoprene monomer to be polymerized. The TAT or TVT can be added substantially any time during the polymerization procedure by conventional methods such as simply stirring all or separately spaced increments of the TAT or TVT into the polymerization reaction mixture. The TAT or TVT is preferably added to the polymerization reaction mixture any time up to 90 percent completion of the polymerization reaction (completion meaning the time at which the polymerization reaction is terminated regardless of the percentage of conversion of the isoprene monomer). The TAT or TVT is still more preferably added any time after about 10 percent completion and prior to about 90 percent completion of the polymerization reaction.

EXAMPLE

A conventional polymerization reactor was purged with nitrogen, charged with cyclohexane, purged again with nitrogen, charged with monomer, charged with initiator, and finally charged with modifier according to the following recipe:

Table I

| | |
|---|---|
| Cyclohexane, phm.[1] | 1000 |
| Isoprene, parts | 100 |
| 3-bromophenyllithium, mhm.[2] | 1.0 |
| 1,3-dibromobenzene, mhm.[2] | Variable |
| Temperature, °F. | 158 |
| Time, hrs. | 1.5 |

[1] Parts of cyclohexane per 100 parts of monomer.
[2] Millimoles per 100 grams of monomer.

After each run, the viscosity of the reactor contents was determined the polymers were recovered from the reactor, stabilized with 1 part per 100 parts polymer of 2,2′-methylene-bis-(4-methyl - 6 - tert - butylphenol) and tested for inherent viscosity, the results of which were as follows:

TABLE II

| Run No.: | 3-bromo-phenyl-lithium, mhm. | 1,3-di-bromo-benzene, mhm. | Microstructure (4) | | | Inh. Vis. (5) | Time for Steel Balls to Drop, min. (6) |
|---|---|---|---|---|---|---|---|
| | | | Conv., percent (3) | Percent cis | Percent 3,4-addition | | |
| 1 | 1.0 | 0 | 85 | 92 | 6.7 | 5.15 | 3.5 |
| 2 | 1.0 | 0.025 | 87 | 77 | 6.5 | 4.85 | 2.6 |
| 3 | 1.0 | 0.10 | 90 | 83 | 6.2 | 4.07 | 1.4 |

The data of Table II demonstrate that with the use of 1,3-dibromobenzene the inherent viscosity of the polyisoprene produced decreased from 5.15 to 4.07 while at the same time, the conversion increased from 85 percent to 90 percent. This was a very surprising result.

The process above described was repeated for four additional runs where the main difference was that 1,4-dibromobenzene was employed in lieu of the 1,3-dibromobenzene. The results of these additional runs were as follows:

TABLE III

| Run No.: | 3-bromo-phenyl-lithium, mhm. | 1,3-di-bromo-benzene, mhm. | Microstructure (4) | | | Inh. Vis. (5) | Time for Steel Balls to Drop, min. (6) |
|---|---|---|---|---|---|---|---|
| | | | Conv., percent (3) | Percent cis | Percent 3,4-addition | | |
| 4 | 1.0 | 0 | 92 | 81 | 6.5 | 4.69 | 3.6 |
| 5 | 1.0 | 0.05 | 85 | 86 | 6.3 | 5.01 | 3.8 |
| 6 | 1.0 | 0.10 | 95 | 83 | 6.8 | 4.55 | 3.3 |
| 7 | 1.0 | 0.15 | 85 | | | 5.03 | 3.3 |

The data of Table III show that 1,4-dibromobenzene did not effect the surprising results shown in Table II and therefore that 1,4-dibromobenzene is not a functional equivalent of 1,3-dibromobenzene in the instant invention.

Three additional runs were carried out in the same manner as set forth hereinabove with the exception that bromobenzene was employed in lieu of 1,3-dibromobenzene. The results of these runs were as follows:

TABLE IV

| Run No.: | 3-bromo-phenyl-lithium, mhm. | 1,3-di-bromo-benzene, mhm. | Microstructure (4) | | | Inh. Vis. (5) | Time for Steel Balls to Drop, min. (6) |
|---|---|---|---|---|---|---|---|
| | | | Conv., percent (3) | Percent cis | Percent 3,4-addition | | |
| 8 | 1.0 | 0 | 82 | 84 | 6.5 | 4.95 | 3.4 |
| 9 | 1.0 | 0.05 | 83 | | | 5.09 | 4.0 |
| 10 | 1.0 | 0.10 | 91 | 92 | 6.7 | 5.11 | 4.4 |

The data of Table IV show that bromobenzene did not effect the surprising results set forth in Table II and that therefore bromobenzene is not a functional equivalent of 1,3-dibromobenzene in the invention.

In all of Tables II to IV the conversion values, microstructure values, inherent viscosity, and steel ball drop times were determined as follows:

(3) Conversion was determined by multiplying the weight of the polyisoprene obtained by 100 and dividing the resulting number by the weight of the isoprene charged.

(4) The microstructure was obtained in accordance with the procedure set forth in U.S. Patent 3,215,679, column 11, lines 4–25.

(5) The inherent viscosities were determined in accordance with the procedure set forth in U.S. Patent 3,215,679, column 11, lines 26–39 except that line 39 should read "by the weight of the soluble portion of the original sample."

(6) The steel ball drop time is the time elapsed from the initial contact of the spherical steel ball weighing 3.52 grams with the surface of the polymerization mixture in the reactor until the steel ball reached bottom of the reactor, the polymerization mixture having been unterminated and the ball being dropped from a standard height of 6 inches. In each of the runs the polymerization was carried out in the same size reactor using the same amounts of reactants so that the volume of materials in the reactor was standardized and the distance from the surface of the polymerization mixture to the bottom of the reactor was also standardized. Thus, the steel ball traveled substantially the same distance through substantially the same amount of polymerization mixture for each run so that the shorter the time for the steel ball drop the less viscous the polymerization mixture.

Reasonable variations and modifications are possible within the scope of this disclosure without departing from the spirit and scope thereof.

What is claimed is:

1. A polymerization method comprising: contacting isoprene under polymerization conditions of −100 to 150° C. and sufficient pressure to maintain the polymerization mixture substantially in liquid phase, with a monobromophenyllithium compound selected from the group consisting of 3-bromophenyllithium and 4-bromophenyllithium in an amount to provide from 0.05 to 50 milliequivalents of lithium per 100 grams of said isoprene and in the presence of 1,3-dibromobenzene in an amount within the range of 0.01 to 5 moles per mole of said monobromophenyllithium compound.

2. The method according to claim 1 wherein said monobromophenyllithium is 3-bromophenyllithium.

3. The method according to claim 2 wherein the polymerization is carried out in the presence of at least one diluent selected from the group consisting of aromatic, aliphatic, cycloaliphatic, and combinations thereof containing 4 to 15 carbon atoms per molecule.

4. The method according to claim 1 wherein said monobromophenyllithium is 3-bromophenyllithium and the polymerization is carried out in the presence of cyclohexane as the polymerization diluent.

5. The method according to claim 2 wherein said polymerization is at least partially carried out in the presence of one of tetraallyltin (TAT) and tetravinyltin (TVT), the amount of TAT or TVT present being that which is effective to improve the processability of the polyisoprene produced.

6. The method according to claim 5 wherein the TAT or TVT is added to the polymerization reaction mixture any time up to 90 percent completion of the polymerization reaction and the TAT or TVT is added in amounts in the range of from about 0.025 to about 1.25 millimoles of the TAT or TVT per 100 grams of isoprene monomer to be polymerized.

7. The method according to claim 5 wherein the polymerization reaction is at least partially carried out in contact with one of tetraallyltin (TAT) and tetravinyltin (TVT), the TAT or TVT being added to the polymerization reaction mixture en masse or sequentially any time from about 10 percent to about 90 percent completion of the polymerization reaction and the TAT or TVT is added in amounts in the range of from about 0.025 to about 1.25 millimoles of the TAT or TVT per 100 grams of isoprene monomer to be polymerized.

References Cited
UNITED STATES PATENTS 3,215,679    11/1965    Trepka _____ 260—94.2 XR JOSEPH L. SCHOFER, *Primary Examiner.*

WILLIAM HAMROCK, *Assistant Examiner.*

U.S. Cl. X.R.

260—94.3